United States Patent [19]

Shimizu et al.

[11] Patent Number: 5,383,068
[45] Date of Patent: Jan. 17, 1995

[54] HEAD POSITION RECOGNITION METHOD, A SPEED CALCULATION METHOD, AND A HEAD MOVEMENT SPEED CONTROL DEVICE

[75] Inventors: Ryosuke Shimizu, Hirakata; Tetsurou Takaoka, Uwajima, both of Japan

[73] Assignee: Matsushita Electric Industrial Co., Ltd., Osaka, Japan

[21] Appl. No.: 883,209

[22] Filed: May 14, 1992

[30] Foreign Application Priority Data

May 14, 1991 [JP]  Japan ................................. 3-107799
Dec. 10, 1991 [JP]  Japan ................................. 3-325953

[51] Int. Cl.$^6$ .......................... G11B 5/596; G11B 7/00
[52] U.S. Cl. ............................ 360/78.06; 360/78.04; 360/77.08; 369/44.28
[58] Field of Search ............... 360/78.06, 78.04, 77.08, 360/78.07, 78.08; 369/44.26, 44.28, 44.29

[56] References Cited

U.S. PATENT DOCUMENTS 4,032,984  6/1977  Kaser et al. .................. 360/77.08
4,499,511  2/1985  Sugaya ........................ 360/78.06

FOREIGN PATENT DOCUMENTS 51-131607  11/1976  Japan .
58-146058   8/1983  Japan .
3-242882   10/1991  Japan .

Primary Examiner—Aristotelis Psitos
Assistant Examiner—Varsha A. Kapadia
Attorney, Agent, or Firm—Willian Brinks Hofer Gilson & Lione

[57] ABSTRACT

A head position recognition method, a speed calculation method, and a head movement speed control device which provide for an overall improvement in storage device performance without increasing the seek time of the data head. Discrete servo sectors are provided circumferentially to the recording medium, four servo patterns with a minimum repeat cycle of 24 tracks are written into each servo sector. The range of the head seek distance that should be obtained at the current servo sector is estimated based on the previously calculated head seek distance, and the calculated head seek speed is corrected to the true head seek distance.

2 Claims, 10 Drawing Sheets

HEAD POSITION RECOGNITION METHOD, A SPEED CALCULATION METHOD, AND A HEAD MOVEMENT SPEED CONTROL DEVICE

BACKGROUND OF THE INVENTION

1. Field of the Invention

The present invention relates to a head position recognition method, a speed calculation method, and a head movement speed control device for controlling a data read/write head used to access a desired data track on a rotary recording medium.

2. Prior Art

The servo-side servo method whereby servo data written to one side of the recording medium is used to position the read/write head at the target data track is widely used with magnetic disk storage media. The drawback to this method, however, is that precise positioning of the data head to the required track is dependent upon the precise relationship between the servo and data side tracks. Because various environmental changes, including temperature changes inside the device, can easily disturb this relationship, resulting in offset tracks, it is difficult to increase the real track density.

The data-side servo method has therefore become more common because the servo data is written to the data side of the medium for improved read/write reliability. There are also different variations of the data-side servo method, one of which is the sector servo method.

In the sector servo method, a servo sector is reserved at the beginning of each data sector to store the positioning information. When the desired data track is selected, the servo data written to the servo sector is read to drive the data head over the data track. The drawback to this method, however, is that only tracking control data is written to the servo sector. It is therefore necessary to provide a separate position detection device to move the head at high speed, or to supply head positioning data from the servo side of the media. Furthermore, when sufficient positioning data is written to the servo sector to enable high speed disk access based on the servo sector data alone, the servo sectors occupy a higher percentage of total disk space than the data sectors, resulting in a significant drop in storage capacity.

An alternative method was therefore proposed for encoding the track number in the servo sector, and using this data for head control (Japanese Patent Laid-Open Number S51-131607). With this method, head speed is controlled by obtaining the position data (address) of the tracks passed by the head during the data seek operation at dispersed intervals, obtaining the average seek time between sectors and comparing this average with the command seek time. This method is now quite common because it can be realized with a simple mechanical design and yields good cost performance even when the number of data disks in the disk drive is few.

The drawback to this method (Japanese Patent Laid-Open Number S51-131607) of controlling the access speed by obtaining the average seek time between sectors from the track address is the control characteristics of the access speed. A method has also been proposed (Japanese Patent Application Number M2-39979) for improving these characteristics.

FIG. 9 is an example of the servo pattern of the servo sector proposed in Japanese Patent Laid-open H3-242882. The dispersed servo sectors embedded in the data tracks of a rotary storage medium are shown. The servo sector 2, data sector 3, and data head 5 are shown in FIG. 9. The servo sector 2 comprises a burst area 18 used to obtain the automatic gain control (AGC) signal, an erase area 19 for detecting the servo sector, a track code 20 for obtaining the track address, and a position address 21 for obtaining the offset of the data head 5 from the correct track position for tracking control. The erase area 19 is set to have the greatest possible erase time for the data tracks, and the position address 21 is composed of burst signals $\alpha$ and $\beta$ offset one-half track to the servo sector 2. The servo sectors are read-only.

The track code 20 is an embedded code comprising a synchronization bit S indicating the beginning of the track code 20, a zone discrimination component 20a comprising three dibit pattern A, B, and C identifying the guard zone, data zone, and type of data zone, a first servo pattern 20b comprising three-phase 3 tracks/cycle dibit pattern G, H, and I, a second servo pattern 20c comprising two dibit pattern D and E of 12 tracks/cycle with a three track offset, and a third servo pattern 20d comprising a dibit pattern F having 6 tracks/cycle and offset from the second servo pattern at least 1.5 tracks.

When reading or writing to the data track, the data head 5 follows a track that overlaps two adjacent servo sectors 2. The data head 5 is shown in FIG. 9 positioned at the sixth data track on the storage medium, resulting in the read signal waveform shown in FIG. 10. Specifically, through the servo sector the data head 5 obtains a "servo sector signal" corresponding to the servo patterns, specifically comprising a burst component 18, no-signal erase component 19, a track code 20 comprising the synchronization bit S, zone discrimination bits A, B, and C, second servo pattern positions D and E, third servo pattern position F, and first servo pattern positions G, H, and I, and a position address 21 component comprising the burst signals $\alpha$ and $\beta$. Because the data head 5 follows a path overlapping half of two tracks through the servo sector, the signal output when the servo pattern is present on only one track is approximately half signal output when the servo pattern is present on both servo tracks.

Japanese Patent Laid-open H3-242882 describes a device and method for recognizing where the data head 5 is positioned in the 12 track/cycle servo pattern using the patterns D, E, F, G, H, and I in the playback waveforms A–I. The possible head position is first restricted to three of the twelve tracks by referencing a table or algorithm based on the digitized signals for D, E, and F (e.g., L, H, and H in the FIG. 10 waveform from the data head 5).

The peak values of the G, H, and I read signals are next stored, and the binary expression G>H, H>I, and I>G (e.g., H, L, H for this data head 5) is generated. By again referencing a table or algorithm based on these digitized signals, the possible data head position is further restricted within the three candidate tracks to an area of $\frac{1}{3}$ track width. The maximum and minimum peak hold signals are then selected from the G, H, and I signals based on the digitized data G>H, H>I, and I>G (where the maximum is G and the minimum is H in this example).

An offset of approximately half the maximum peak hold value is then applied to the signal with the lowest peak value (H in this example). This signal increased by the offset value is then compared with the second highest peak value signal (in this example, H+ offset and I, respectively) using the equation (H+ offset)>I. This comparison further restricts the data head position from the previously limited ½ track width to ¼ track width. Using this result and the signals D, E, F, G, H, and I, it is possible to recognize the position of the data head in the 12 track/cycle servo pattern with ¼ track resolution in the 48-part (=12 * 4) subtrack code.

The head positioning device shown in Japanese Patent Application H2-39979 positions the head in the target track using this head position recognition method. Specifically, when positioning the head to the target track with speed control, the position of the head in the 12 track/cycle servo pattern is recognized by sampling the playback signal of the servo pattern obtained each time the head passes the servo sector. Furthermore, each time the head passes the servo sector, the distance the head has travelled is obtained from the previously sampled head position and the currently detected head position, and the average seek time of the head between samples is further obtained by dividing this distance by the sample cycle.

When positioning the head to the target track with speed control, the target speed at which stable track access is possible is specified for each servo sector according to the position of the head relative to the target track. This speed control system is thus a feedback loop in which the difference between the target speed and the average seek speed of the head between samples is returned.

For example, it is assumed that the previously sampled head position is within the range of subtrack code 2 in the 12 track/cycle servo sector, and is currently positioned within the range of subtrack code 20. The average seek speed V of the head between samples can thus be expressed by equation 1 below $$V = (STC_n - STC_0) * (N * X_{tp}/48) T_s \qquad (1)$$

where $STC_0$ is the subtrack code of the previous sample, $STC_n$ is the subtrack code of the current sample, $X_{tp}$ is the track pitch, and $T_s$ is the sampling cycle of the servo sector.

Thus, if $X_{tp} = 12$ μm and $T_s = 300$ μsec, the average seek speed of the head is V=18 cm/sec. The speed control loop is thus formed by obtaining the average seek speed of the head, reducing this to the target speed appropriate to the distance to the target track, and returning this value to the feedback loop.

As described above, however, the servo pattern of the invention described in Japanese Patent Laid-open H3-242882 has a 12 track cycle. Thus, when the distance travelled between sectors by the head is greater than twelve tracks, the average seek speed of the head between sectors cannot be correctly obtained.

For example, it is assumed that the previously sampled head position is within the range of subtrack code 2 in the 12 track/cycle servo sector during high speed control, and is currently positioned within the range of subtrack code 3. The average seek speed V of the head between samples must therefore be detected as V=49 cm/sec because the distance between the servo sectors is 48 subtrack codes +1=49 subtrack codes. If equation 1 is used to detect the average seek speed, however, the result will be V=1 cm/sec. Thus, because the target speed is calculated based on a falsely detected average seek speed, the speed control loop will fail and seek errors occur. Thus, if the distance of head travel between servo sectors is limited to 12 tracks, the maximum possible seek speed will be suppressed, and the seek time to the target track will increase.

For example, if the track pitch $X_{tp} = 12$ μm and the sample cycle $T_s = 300$ μsec, the maximum speed $V_{max} = 48$ cm/sec. With a standard 3.5" hard disk drive, however, the maximum seek speed is approximately 1 m/sec. because the required seek speed is typically the average seek speed plus several milliseconds. It is, of course, possible to increase the maximum seek speed by shortening the sampling cycle $T_s$, but this will increase the space required by the servo sector on the storage medium and reduce the data storage capacity of the drive. Furthermore, the maximum seek speed can also be increased by increasing the track pitch Xtp, but this will reduce the number of tracks on the storage medium and likewise reduce the data storage capacity of the drive. It follows that limiting the distance travelled by the head between servo sectors to twelve tracks limits the detection range of the head seek speed, and limits the improvements that can be achieved in the overall head positioning performance of the storage device.

SUMMARY OF THE INVENTION

Therefore, an object of the present invention is to provide a head position recognition method, a speed calculation method, and a head movement speed control device which provide for an overall improvement in storage device performance without increasing the seek time of the data head.

The head position recognition method, a speed calculation method, and a head movement speed control device that achieve the above objective are comprised as described below.

The head position recognition method of the present invention forms dispersed servo sectors circumferentially around a rotary recording medium, and forms first, second, third, and fourth servo patterns in the servo sector. The first servo pattern is a three-phase servo pattern with three tracks per cycle. The second servo pattern is composed of at least a two-phase pattern with a minimum twenty-four tracks per cycle and an offset of at least six tracks between the phases. The third servo pattern is composed of at least a two-phase pattern with a minimum twelve tracks per cycle and an offset of at least three tracks between the phases. The fourth servo pattern is composed of six tracks per cycle and an offset of at least 1.5 track from the third servo pattern. The position of the data head within the minimum twenty-four track cycle is obtained by first determining the position of the head within a ten track range using the second servo pattern, then determining the position of the head within a three track range using the third servo pattern, and finally determining the position of the head within the range of a single track using the first servo pattern.

The speed calculation method of the present invention forms dispersed servo sectors circumferentially around each surface of a rotary recording medium having at least two recording surfaces, provides an N tracks/cycle servo pattern (where N is an integer) in the servo sector, and divides the N-track/cycle servo pattern by demodulation processing into M subtrack codes (where M≧N). The track code detected time sequentially each time the data head passes the servo sector is differentiated by the demodulation process into subtrack codes.

The distance of head travel is obtained from the difference between the subtrack code demodulated from the current track code and from the track code detected P (where P is an integer) servo sectors previously. The seek speed of the head in the circumferential distance of the recording medium is calculated based on the distance of head travel. A first and second head seek distance are generated when calculating the head seek speed. The first head seek distance is the sum of the head seek distance obtained at the previous servo sector plus a first offset value, and the second head seek distance is the difference of the head seek distance calculated at the P-previous servo sector minus a second offset value.

When the head seek distance calculated for the current servo sector is greater than the first head seek distance, the difference of the calculated head seek distance minus M is used as the true head seek distance. When the head seek distance calculated for the current servo sector is less than the second head seek distance, the sum of the calculated head seek distance plus M is used as the true head seek distance. The head seek speed is calculated using the true head seek distance.

The head movement speed control device according to the invention comprises dispersed servo sectors formed circumferentially around a rotary recording medium, a data head that can at least read the information written on the recording medium, a servo information demodulation means for extracting the servo information in the dispersed servo sectors from the read signal of the data head, a head position information recognition means for recognizing the data head position to $\frac{1}{2}^N$ data track width resolution based on the position of the data head relative to the data track, a speed command means for outputting the track access speed command according to the distance to the target track based on the output of the head position information recognition means, a speed calculation means for obtaining the seek speed of the data head radially to the recording medium based on the output of the head position information recognition means, and a positioning means for moving the data head to the desired position radially to the recording medium, and to which a signal based on the speed error of the speed command means and the speed calculation means is returned for track access control.

Thus, the head position recognition method of the present invention embeds dispersed servo sectors circumferentially around a rotary recording medium, and forms four different servo patterns with a 24 track cycle in the servo sector, and can correctly calculate during speed control the average seek speed of the head between servo sectors for a head seek movement between sectors of up to 24 tracks.

For example, if the track pitch Xtp=12 μm, the sampling cycle Ts=300 μsec, and the servo pattern repeats on a cycle of at least 24 tracks, the maximum seek speed will be Vmax=96 cm/sec. The calculation threshold for the head seek distance between servo sectors is thus improved, and the speed detection range is doubled compared with the conventional method. As a result, high speed track access (seek) performance is possible.

The speed calculation method calculates the head seek speed based on the head seek distance from the P-previous servo sector to the servo sector currently being passed, and generates a first head seek distance, which is the sum of the head seek distance obtained at the P-previous servo sector plus a first offset value, and a second head seek distance, which is the difference of the head seek distance calculated at the P-previous servo sector minus a second offset value. When the head seek distance calculated at the current servo sector is not between these first and second head seek distances, the head seek speed is calculated using a calculated true head seek distance, which is the current calculated head seek distance minus or plus the value M. Even if the servo sectors are formed with a servo pattern having a short repeating cycle, this method contains a function to correct the head seek speed calculated by equation 1 to the true head seek speed by estimating the range of the true head seek distance that should be obtained at the current servo sector based on the previously calculated head seek distance. It is therefore possible to calculate the head seek speed without having an upper limit to the head seek speed in the repeat cycle of the servo pattern, and high speed track seek (access) performance can be achieved.

In addition, the head movement speed control device that applies the above head position recognition method and speed calculation method according to the present invention provides the advantage of an increased speed detection range by providing four servo patterns with a minimum 24 track cycle in the dispersed servo sectors formed around the recording medium, and the advantage of an expanded dynamic range to the head seek speed without being limited by the servo pattern repeat cycle, and high speed track seek (access) performance can be achieved.

BRIEF DESCRIPTION OF THE DRAWINGS

The present invention will become more fully understood from the detailed description given below and the accompanying diagrams wherein.

DESCRIPTION OF PREFERRED EMBODIMENTS

The head position recognition method, speed calculation method, and head movement speed control device according to the preferred embodiments of the present invention are described below.

Figure 1:
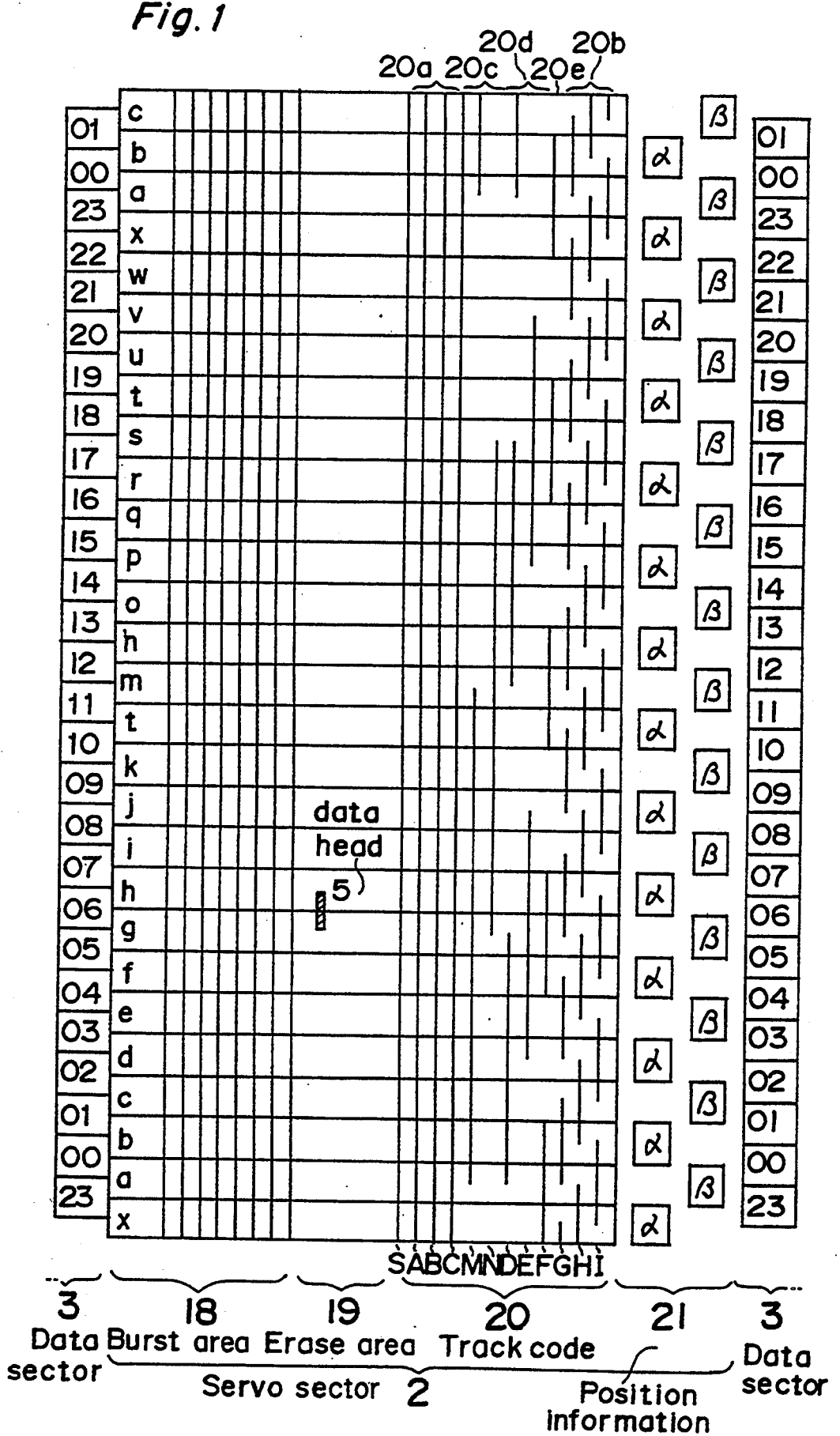
FIG. 1 is an example of the servo pattern in the dispersed servo sectors embedded in the data tracks of a rotary recording medium according to the preferred embodiment of the present invention.

Shown in FIG. 1 is an example of a servo pattern for dispersed servo sectors embedded in the data tracks of a rotary recording medium 1 according to a first embodiment of the invention. The servo sector 2, data sector 3, and data head 5 are shown in FIG. 1. The servo sector 2 comprises a burst area 18 used to obtain the automatic gain control (AGC) signal, an erase area 19 for detecting the servo sector, a track code 20 for obtaining the track address, and a position address 21 for obtaining the offset of the data head 5 from the correct track position for tracking control. The erase area 19 is set to have the greatest possible erase time for the data tracks, and the position address 21 is composed of burst signals $\alpha$ and $\beta$ offset one-half track to the servo sector 2. The servo sectors are read-only.

The track code 20 is an embedded code comprising a synchronization bit S indicating the beginning of the track code 20, a zone discrimination component 20a comprising three dibit pattern A, B, and C identifying the guard zone, data zone, and type of data zone, a first servo pattern 20b comprising three-phase dibit pattern G, H, and I with 3 tracks/cycle, a second servo pattern 20c comprising two dibit pattern M and N Of 24 tracks/cycle with a six track offset between the patterns, a third servo pattern 20d comprising two dibit pattern D and E of 12 tracks/cycle with a three track offset between the patterns, and a fourth servo pattern 20e comprising a dibit pattern F having six tracks per cycle and an offset of at least 1.5 track from the third servo pattern.

It is to be noted that in FIG. 1 the second and third servo patterns 20c and 20d comprising two dibit pattern and the fourth servo pattern 20e are provided on one side of the first servo pattern 20b, but the first, second, third, and fourth servo patterns may be formed in any desired sequence. In addition, when reading or writing to the data track, the data head 5 overlaps two adjacent servo sector tracks.

Figure 2:
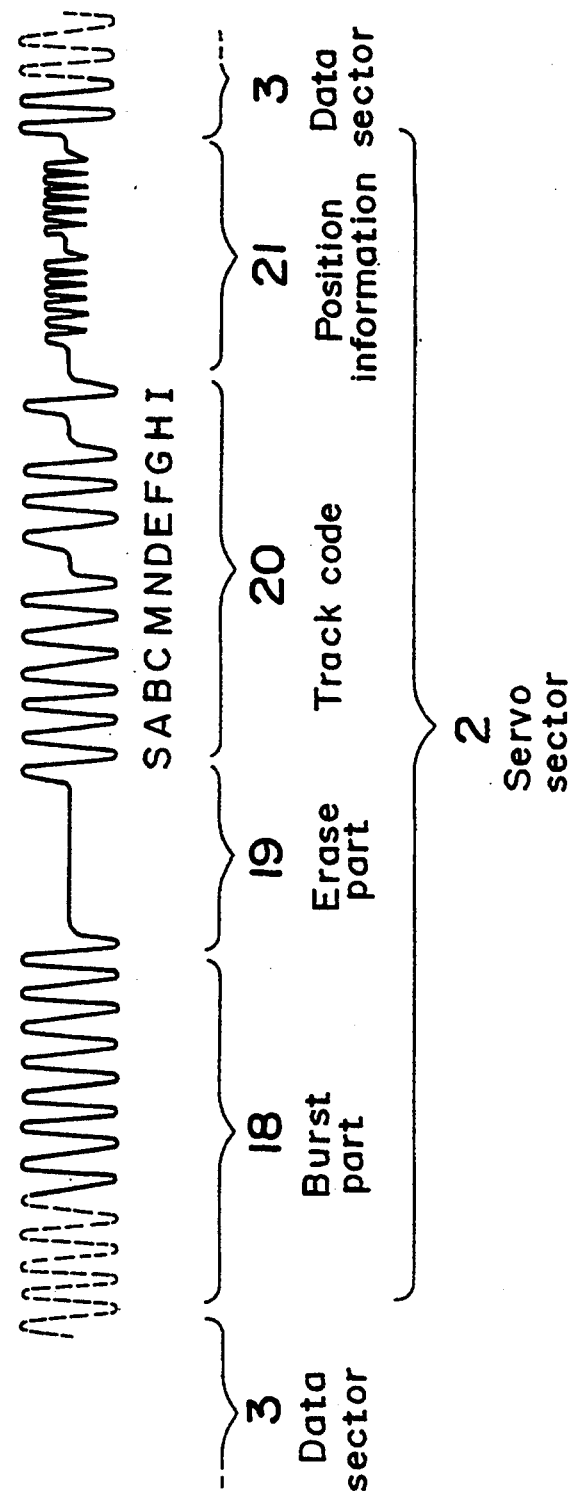
FIG. 2 is an example of the read waveform when the data head crosses the servo sector shown in FIG. 1 for the preferred embodiment of the present invention.

The data head 5 is shown in FIG. 1 positioned at data track 6 on the storage medium, resulting in the read signal waveform shown in FIG. 2. Specifically, through the servo sector the data head 5 obtains a "servo sector signal" corresponding to the servo patterns, specifically comprising a burst component 18, no-signal erase component 19, a track code 20 comprising the synchronization bit S, zone discrimination bits A, B, and C, second servo pattern positions M and N, third servo pattern positions D and E, fourth servo pattern position F, and first servo pattern positions G, H, and I, and a position address 21 component comprising the burst signals $\alpha$ and $\beta$. Because the data head 5 follows a path overlapping half of two tracks through the servo sector, the signal output when the servo pattern is present on only one track is approximately half the signal output when the servo pattern is present on both servo tracks. The read signal shown in FIG. 2 thus has an output level of i at positions S, A, B, C, M, N, E, F, G, and I, an output level of O at D and H, and an output of $\frac{1}{2}$ at burst positions $\alpha$ and $\beta$. It shall be obvious that this read signal will change according to the track position of the data head 5 on the recording medium.

The track position of the data head 5 on the recording medium can be detected with high precision based on the first through fourth servo patterns 20b, 20c, 20d, and 20e as described below, and the head can be positioned to the selected track through the seek operation.

Figure 3:
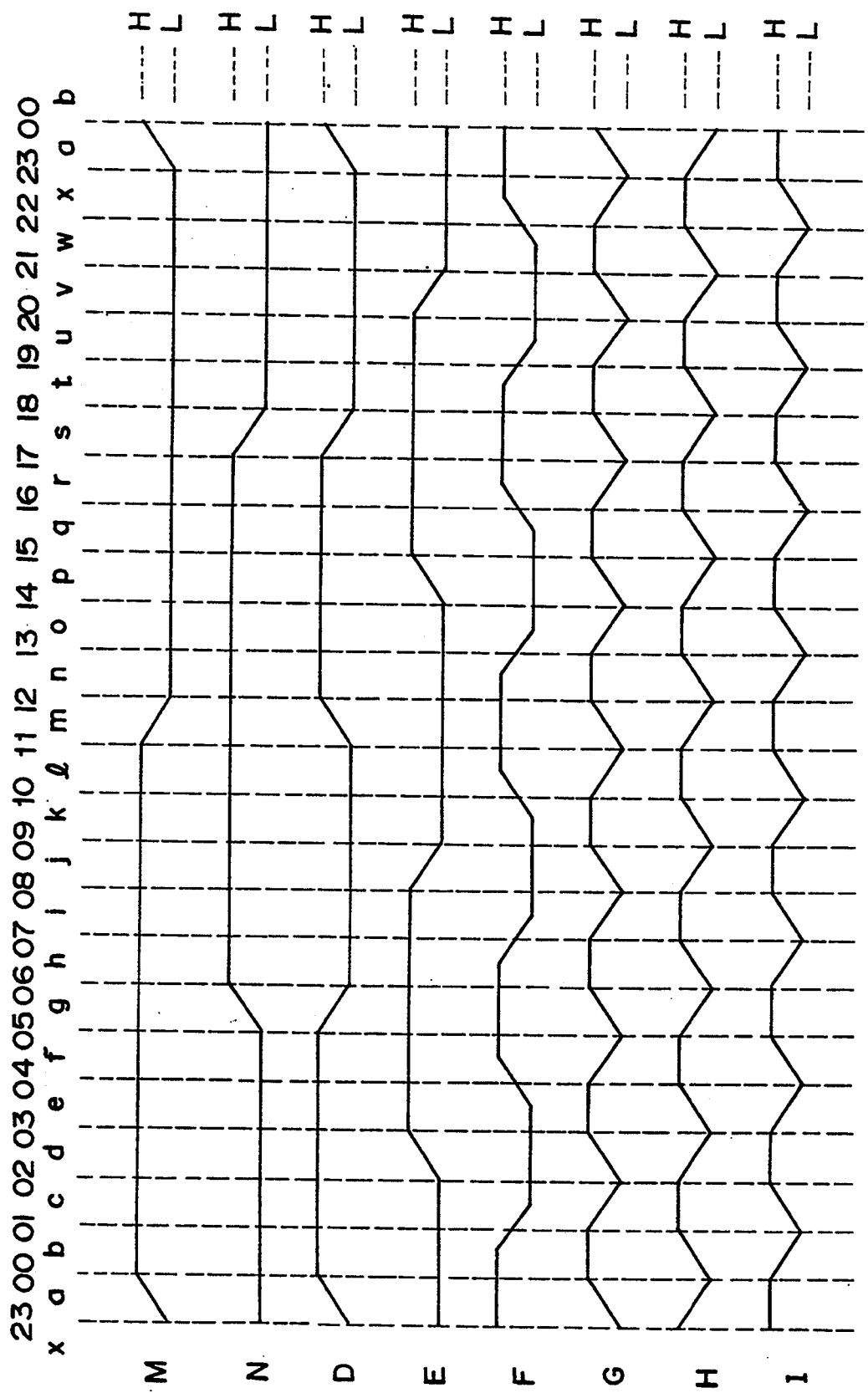
FIG. 3 shows the ideal change in the output state of the read signal from the servo sector shown in FIG. 2 when the data head moves at low speed from the inside to the outside circumference of the recording medium.

FIG. 3 shows the ideal change in the output state of the read signal from the servo sector shown in FIG. 2 when the data head 5 moves at low speed from the inside to the outside circumference of the recording medium. The slope of each read signal in FIG. 3 is determined by an output corresponding to the ratio of the dibit pattern to the head width when the head crosses each dibit pattern because the data head 5 has a finite width. The numbers 0–23 in FIG. 3 correspond to the track numbers of the 24-track cycle shown in FIG. 1, and the letters a–x indicate the subtrack numbers in the 24-track cycle offset one-half track from the data tracks.

The read signals M, N, D, E, and F obtained from the second, third, and fourth servo patterns are digitized on a predetermined level boundary, and the peak values of the read output of the read signals G, H, and I obtained from the first servo pattern are latched, compared, and digitized. The two binary expressions obtained from read signals M, N, D, E, F, G, H, and I are defined as the first binary expression. A predetermined offset value is added to the signal holding the lowest value in the G, H, and I signals according to the first binary expression, the resulting sum signal is again compared with the corresponding signals to generate the second binary expression, and the position of the data head 5 on the servo track is recognized to a precision of $\frac{1}{2}$ track width from these first and second digital values.

First, each of the two servo patterns M and N has a cycle of 24 tracks with a 6-track offset such that there is a six track overlap between the two patterns. Signals M and N are respectively obtained from these patterns. It is thus possible to identify the position of the data head 5 within a range of six tracks from the read output of the M and N signals if the read signal state is ideal. However, the real identifiable track range is greater than six tracks because the data head 5 has a finite width and the read output does not change digitally, and because the read waveform is affected by the recording medium and the data head response characteristics. Thus, the identifiable range of the data head using only the digitized M and N signals is seven tracks, a range that includes the transition of the read signal from H to L and from L to H as shown in FIG. 3.

It follows, of course, that if the repeat cycle of the M and N signals is greater than 24 tracks, the range of tracks that can be identified using only these two signals will increase. For example, if the repeat cycle of the M and N signals is 36 tracks, there will be a 9 track offset and overlap, and the smallest range of tracks identifiable using only the M and N signals is 10 tracks.

It is to be noted that the repeat cycle oft he M and N signals is any integer multiple of 12, e.g., 48 or 60, because the repeat cycle of the next D and E signals is 12 cycles. If the repeat cycle of the M and N signals is 48 tracks, the smallest range of tracks identifiable using only the M and N signals will be 13 tracks including the transition of the read signal from H to L and from L to H. Because this is greater than the 12 track cycle of the following D, E, and F signals, it will not be possible to determine the position of the head with any greater precision. As a result, the maximum repeat cycle for the M and N signals is 36 tracks.

After the position of the data head 5 is determined to within a range of 7 of the 24 tracks using the digitized 24-track/cycle M and N signals (or 10 of 36 tracks using 36-track/cycle signals), the position of the head is further recognized using the D, E, and F signals.

Each of the two servo patterns D and E has a cycle of 12 tracks with a 3-track offset such that there is a three track overlap between the two patterns. Signals D and E are respectively obtained from these patterns. It is thus possible to identify the position of the data head 5 within a range of three of twelve tracks from the read output of the D and E signals if the read signal state is ideal. However, the real identifiable track range is greater than three tracks because the data head 5 has a finite width and the read output does not change digitally, and because the read waveform is affected by the recording medium and the data head response characteristics. A fourth servo pattern F with a six track cycle and a 1.5 track overlap to pattern D or E is provided. Thus, the fourth servo pattern F will always be either L or H when signal D or E changes from L to H or H to L.

The binary state (digital information) of the signals M, N, D, E, and F in each servo track in the 24-track/-cycle servo sector is shown in Table 1.

TABLE 1

| Period | Signal M | Signal N | Signal D | Signal E | Signal F |
|---|---|---|---|---|---|
| a | * | L | * | L | H |
| b | H | L | H | L | * |
| c | H | L | H | L | * |
| d | H | L | H | * | L |
| e | H | L | H | H | * |
| f | H | L | H | H | * |
| g | H | * | H | H | H |
| h | H | H | L | H | * |
| i | H | H | L | H | * |
| j | H | H | L | * | L |
| k | H | H | L | L | * |
| l | H | H | L | L | * |
| m | * | H | * | L | H |
| n | L | H | H | L | * |
| o | L | H | H | L | * |
| p | L | H | H | * | L |
| q | L | H | H | H | * |
| r | L | H | H | H | * |
| s | L | * | * | H | H |
| t | L | L | L | H | * |
| u | L | L | L | H | * |
| v | L | L | L | * | H |
| w | L | L | L | L | * |
| x | L | L | L | L | * |

Those values indicated with an asterisk (*) are indeterminate, i.e., whether the digitized value is H or L could not be determined during signal detection from the data head position. As will be known from Table 1, when the level of either signal D or E is indeterminate, the level of signal F will be either L or H. Thus, if the level of signals M, N, D, E, and F is detected, the position of the data head 5 can be determined to within a range of three of 24 tracks.

It is to be noted that all possible 5-bit words for the M, N, D, E, and F signal states (e.g., HLLLL) are not shown in Table 1 because both signals M and N have a 24 track cycle.

The next step is to determine where in the three track range identified by the process described above the data head 5 is positioned. This is done using the read signals G, H, and I obtained from the first servo pattern.

Figure 4:
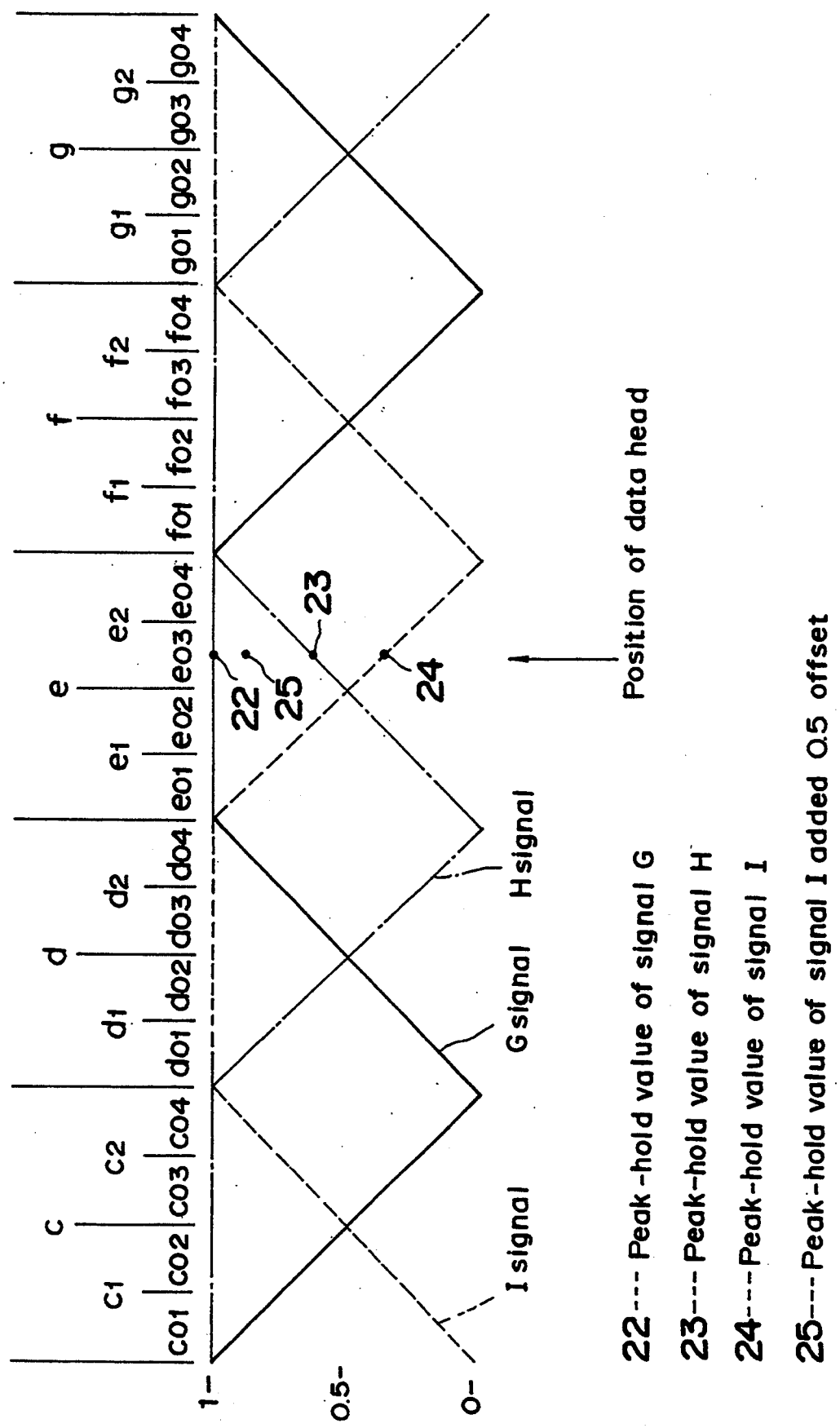
FIG. 4 shows the ideal change in the output state of the read signals G, H, and I from the servo sector shown in FIG. 1 when the data head 5 moves at low speed from the inside to the outside circumference of the recording medium.

FIG. 4 shows the ideal change in the output state of the read signals G, H, and I from the servo sector shown in FIG. 1 when the data head 5 moves at low speed from the inside to the outside circumference of the recording medium. FIG. 4 is an enlarged view of the output state when the data head 5 moves from servo track c to g, and shows signals G, H, and I overlaid. The output peaks of signals G, H, and I are also shown normalized (max.=1). If it is here assumed that the detection codes of signals M, N, D, E, and F are H, L, H, H, and L, the data head will be known from Table 1 to be in either servo sector track d, e, or f.

If the read signal peaks of signals G, H, or I are the values indicated by 22, 23, and 24 in FIG. 4, it will be known that the value of signal G is greater than the value of signal H, the value of signal H is greater than the value of signal I, and the value of signal I is less than the value of signal G. In other words, the result returned by the signal comparisons G>H, H>I, and I>G, will be H, H, and L, respectively. It is thus determined that the order of signal G, H, and I peak values is G, H, I. As shown in FIG. 4, the position of the data head is determined to be within track e of the three tracks d, e, and f from the fact that the value of G is highest, and more precisely to be within the range of e2 (FIG. 4) because H>I.

Next, an offset value is added to the signal with the lowest peak value (signal I) of the three signals G, H, and I based on the first binary expression (H-L-H-H-L-H-H-L for the signals M, N, D, E, F, G, H, and I). The first offset value is approximately 0.5 when the maximum peak of G, H, and I is normalized to 1. After adding the 0.5 offset value to signal I, the peak of signal I will shift from point 24 to 25 in FIG. 4. When the comparison (value of signal H >value of signal I) is next performed, the result will be L. The comparison H>I (after adding the 0.5 offset to I) is useful for making a more precise determination of data head position. In other words, if the result of the comparison H>I (after adding the 0.5 offset to I) is H, the peak of signal H will be more than the 0.5 offset greater than signal I, and if the result is L, then the difference between the peak values of signals H and I will be less than the 0.5 offset value. Thus, the position of the data head can be determined to be either the first part (e03) or the latter part (e04) of the region e2.

Because the comparison H>I returns L in this example, the difference between the peak values of signals H and I is less than the 0.5 offset value, and the position of the data head is known to be within area e03 of range e2 shown in FIG. 4. Thus, the position of the data head relative to the track of the servo sector can be determined to within $1/(2^2)$ track width from the second binary expression.

It is also possible to further add an offset of $-0.25$ to signal I and again compare the sum with the value of signal H (i.e., H>(I+0.5−0.25)) to generate a third binary expression. This value can then be used to determine the position of the data head relative to the track of the servo sector to within $1/(2^3)$ track width.

It is thus possible by adding an offset value obtained by equation 2

$$\pm |f(1,2^N)| \quad (2)$$

to the value of signals G, H, or I to generate an Nth binary expression, and use the resulting value to determine the position of the data head relative to the track of the servo sector to within $1/(2^N)$ track width.

The first binary expression for the results of the comparisons G>H, H>I, and I>G from the three track cycle signals G, H, and I in the servo sector are shown in Table 2. Note that the results H-H-H and L-L-L are not possible, and are therefore not shown in the table.

TABLE 2

| Servo track | | | | | | | | | G>H | H>I | I>G |
|---|---|---|---|---|---|---|---|---|---|---|---|
| a, d | a1 | d1 | g1 | j1 | m1 | p1 | s1 | v1 | L | L | H |
| g, j | g2 | d2 | g2 | j2 | m2 | p2 | s2 | v2 | H | L | H |
| b, e | b1 | e1 | h1 | k1 | n1 | q1 | t1 | w1 | H | L | L |
| h, k | b2 | e2 | h2 | k2 | n2 | q2 | t2 | w2 | H | H | L |
| c, f | c1 | f1 | i1 | l1 | o1 | r1 | u1 | x1 | L | H | L |
| l, l | c2 | f2 | i2 | l2 | o2 | r2 | u2 | x2 | L | H | H |

For example, it is assumed that the data head is positioned in track d, e, or f of the servo sector from Table 1. If the head is positioned as indicated in FIG. 4, the result of the comparison G>H, H>I, I>G will be H, H, L, and it can be determined from Table 2 that the head is in range e2.

A second binary expression is then generated to determine the head position to within ¼ track width, and the signal to which the offset value is added is determined from Table 3.

TABLE 3

| Signal name for 1st offset | 1st binary expression | | |
|---|---|---|---|
| | G>H | H>I | I>G |
| G | L | * | H |
| H | H | L | * |
| I | * | H | L |

If the comparison G>H, H>I, I>G in the first binary expression returns H, H, L, the peak values of signals G, H, and I will be in the order G, H, I, and the offset (0.5) is therefore added to signal I. Referring to Table 3, when the result of the comparison G>H, H>I, I>G returns *, H, L, the first offset is added to signal I, and the result will conform to that described above.

Thus, the signal to which the first offset value is to be added can be determined from Table 3. By repeating the comparison G>H, H>I, I>G immediately after adding the offset to I, the second binary expression is obtained, and the head position can be determined to within $1/(2^2)$ track width. The results of position determination using this second binary expression are shown in Table 4. Note that the dollar ($) mark indicates the offset-added signal, and the asterisk (*) indicates no relationship to the comparison. In the above example, the second binary expression with meaning, specifically H>I, is H, and it is determined from Table 4 that the data head is positioned in area e03.

TABLE 4

| $ | G > H | | | | | H > I | | | | | I > G | | | |
|---|---|---|---|---|---|---|---|---|---|---|---|---|---|---|---|
| G | H | a02 | d02 | g02 | j02 | | | * | | | H | c04 | f04 | i04 | l04 |
| | | m02 | p02 | s02 | v02 | | | | | | | o04 | r04 | u04 | x04 |
| | L | a01 | d01 | g01 | j01 | | | | | | L | c03 | f03 | i03 | l03 |
| | | m01 | p01 | s01 | v01 | | | | | | | o03 | r03 | u03 | x03 |
| H | H | a04 | d04 | g04 | j04 | H | b02 | e02 | h02 | k02 | | | | | |
| | | m04 | p04 | s04 | v04 | | n02 | q02 | t02 | w02 | | | | | |
| | L | a03 | d03 | g03 | j03 | L | b01 | e01 | h01 | k01 | | | | | |
| | | m03 | p03 | s03 | v03 | | n01 | q01 | t01 | w01 | | | | | |
| I | | | * | | | H | b04 | e04 | h04 | k04 | H | c02 | f02 | i02 | l02 |
| | | | | | | | n04 | q04 | t04 | w04 | | o02 | r02 | u02 | x02 |
| | | | | | | H | b03 | e03 | h03 | k03 | L | c01 | f01 | i01 | l01 |
| | | | | | | | n03 | q03 | t03 | w03 | | o01 | r01 | u01 | x01 |

To further determine the position of the head to within $1/(2^3)$ track width, the second offset value of 0.25 is either added to or subtracted from the signal to which the first offset value was added depending on whether the second binary expression is H or L. In addition, 0.25 may also be added to the other value used in the comparison to generate the second binary expression. In the above example, after subtracting 0.25 from the sum of the signal I peak plus 0.5, the H>I comparison can again be performed, or 0.25 can be added to the signal H value before repeating the H>I comparison. If the result is H, the head will be known to be positioned in the latter part of area e03, and if the result is L, in the first part of area e03, and it is thus possible to determine the position of the data head to within $1/(2^3)$ track width precision. In any case, by adding the offset value equal to the maximum read signal value $\pm(1/(2^N))$ and repeating the comparison G>H, H>I, I>G, the position of the data head can be determined to within $1/(2^N)$ track width. Thus, by using the M and N signals as described above, the dynamic range of position recognition can be increased to a 24-track cycle.

Figure 5:
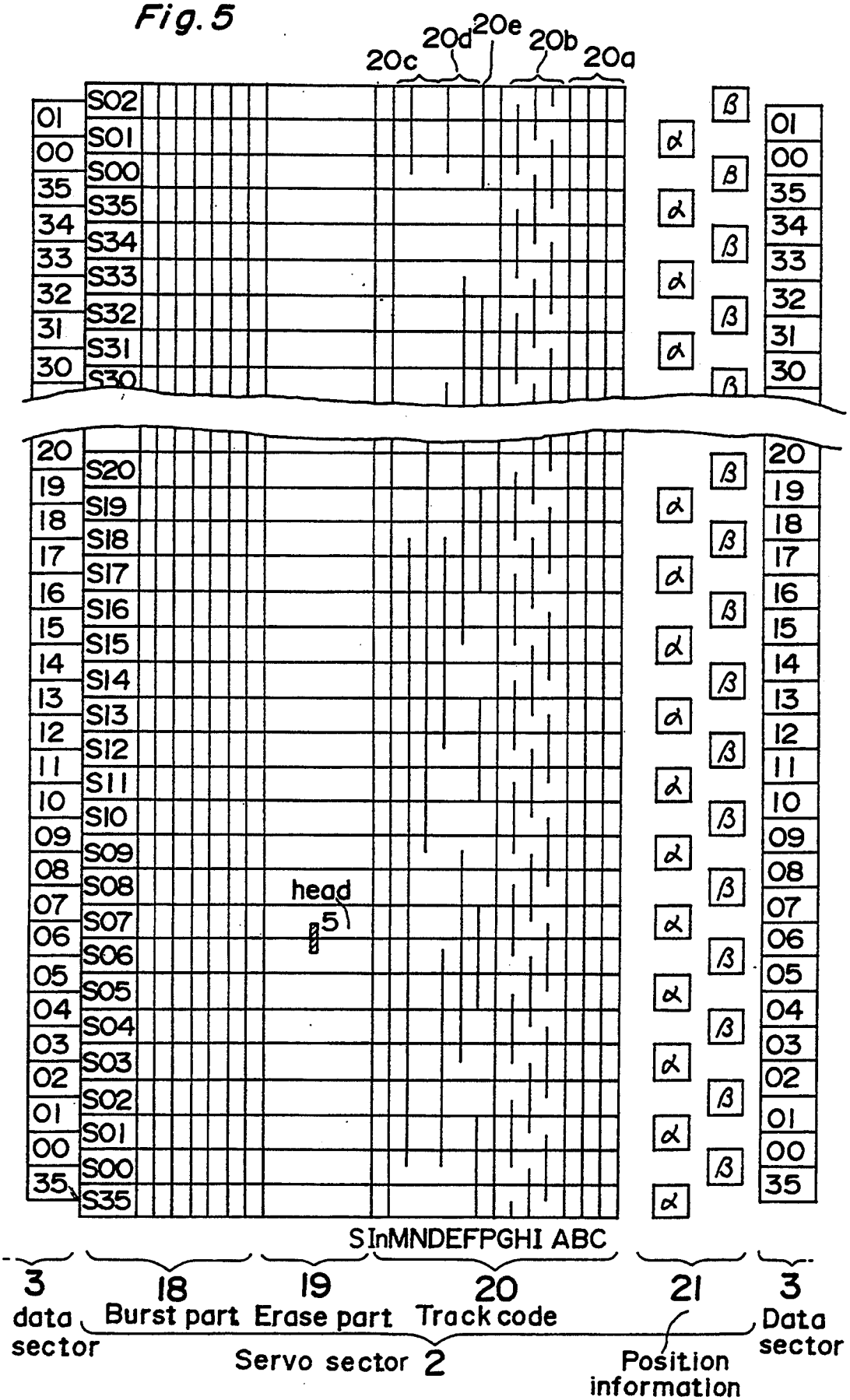
FIG. 5 is an example of the servo pattern in the dispersed servo sectors embedded in the data tracks of a rotary recording medium according to an alternative embodiment of the present invention.

Shown in FIG. 5 is an example of a servo pattern for dispersed servo sectors according to a second embodiment of the invention. In this example the servo pattern repeats on a 36 track cycle. Like parts are represented by like reference numbers in FIGS. 1 and 5. The track code 20 shown in FIG. 5 is an embedded code comprising a synchronization bit S indicating the beginning of the track code 20, an index pattern I indicating an index position every one rotation, a zone discrimination component 20a comprising three dibit pattern A, B, and C identifying the guard zone, data zone, and type of data zone, a first servo pattern 20b comprising three-phase dibit pattern G, H, and I with 3 tracks/cycle and an in-line pattern pad P so that the dibit pattern will align in a straight line radially to the recording medium, a second servo pattern 20c comprising two dibit pattern M and N of 36 tracks/cycle with a six track offset, a third servo pattern 20d comprising two dibit pattern D and E of 12 tracks/cycle with a three track offset, and a fourth servo pattern 20e comprising a dibit pattern F having six tracks per cycle and an offset of at least 1.5 track from the third servo pattern.

The servo pattern shown in FIG. 5 differs from that in FIG. 1 in that the servo patterns are formed in the order second, third, fourth, and first. This is to reduce the possibility of track code detection errors caused by the data head 5 crossing the servo sector at high speed when accessing the target track. Specifically, when the data head 5 is moving, the head crosses the servo sectors at an angle. Furthermore, the angle at which the head crosses the servo sector increases with the speed. Thus, the radial position of the data head to the servo sector when the data head 5 crosses the servo pattern immediately after the erase area 19, and the radial position of the data head to the servo sector when the data head 5 crosses the servo pattern immediately before the position address 21 is slightly different. For example, if the data head 5 is travelling at a relative speed of 1.2 m/sec. to the disk surface, and the data head 5 takes 12 μsec. to pass the track code 20 area, the radial position of the data head to the servo sector when the data head 5 crosses the servo pattern immediately after the erase area 19, and the radial position of the data head to the servo sector when the data head 5 crosses the servo pattern immediately before the position address 21 will have an error of 14.4 μm. This is equivalent to a head speed error of 4.8 cm/sec. when the servo sector cycle is 300 μsec.

However, the track code 20 has a certain time width as shown in FIG. 5. It is therefore impossible to form the first through fourth servo patterns at the same space. The best method is therefore to arrange the servo patterns in the order of importance during high speed head movement. Specifically, as shown in FIG. 5, speed-related detection errors can be minimized by arranging the servo patterns in the following order: second servo pattern with 36 tracks/cycle, third servo pattern with 12 tracks/cycle, fourth servo pattern with six tracks/cycle, and first servo pattern with three tracks/cycle. Furthermore, because a large error occurs in head position recognition when detection errors occur in the second and third servo patterns with a large repeat cycle, the optimum servo pattern sequence is second, third, fourth, first. In addition, this arrangement satisfies the required detection error characteristics for speed control, specifically a wide range of tolerance to speed detection errors at high speed and a narrow range of tolerance to speed detection errors at low speed.

Next, the first servo pattern shown in FIG. 5 comprises the three-phase servo patterns G, H, and I and an in-line pattern pad P so that the dibit pattern formed circumferentially to the recording medium will align in a straight line radially to the recording medium. The in-line pattern pad P is provided to obtain a more precise peak hold value from servo pattern G. As shown in FIG. 4, the normalized peak hold value of the servo pattern G is ideally a value of 0-1. As shown at data tracks 21 and 22 in the data sector 3 in FIG. 1, however, there are long no-signal areas in the circumferential direction on the erase area 19 of the servo pattern G. This results in a DC component overlapping servo pattern G due to the characteristics of the read wave from a magnetic recording medium. An offset results in the peak hold value of servo pattern G, resulting in detection errors when detecting the position of the data head 5 in the servo sector.

By providing the in-line pattern pad P on the erase area 19 side of the servo pattern G as shown in FIG. 5, however, overlapping of the DC component does not occur, and an offset is not introduced to the peak hold value. This makes it possible to correctly detect the position of the data head 5 in the servo sector.

The demodulation method used to determine the relative position of the data head 5 in the servo sector from the 36-track/cycle repeating servo pattern shown in FIG. 5 is essentially the same as that applied with the 24-track/cycle repeating servo pattern shown in FIG. 1.

Specifically, the position of the head is first determined to within a maximum range of ten tracks using the second servo pattern, then to a range of three tracks using the third and fourth servo patterns, and finally to within a range of ¼ track using the first servo pattern.

Thus, after the position of the data head 5 to the servo sector is determined to within a range of 3 of the 36 tracks using Table 5, period S00 in the servo sector is the same as the area indicated by a1, a2, a01, a02, a03, and a04 in Tables 2 and 4, S01 is the same as the area indicated by b1, b2, b01, b02, b03, and b04 in Tables 2 and 4, and S02 in the servo sector is the same as the area indicated by a1, c2, c01, c02, c03, and c04 in Tables 2 and 4. Thus, periods S03–S23 may be thought of as d–x in Tables 2 and 4. Furthermore, because the basic unit of the first servo pattern is three tracks, the demodulation process can be repeated every three tracks from S24, and S24–S35 may be thought of as a repetition of servo sectors a–1 in Tables 2 and 4. Therefore, when the M and N signals are formed on a 36 track cycle as shown in FIG. 5, the dynamic range of precise position recognition can be expanded to 36 tracks.

If the track pitch Xtp=12 μm and the sample cycle Ts=300 μsec, a maximum speed Vmax=96 cm/sec. can be used if the servo pattern repeats on a minimum 24-track cycle. If the servo pattern repeats on a minimum 36-track cycle, however, a maximum speed Vmax=144 cm/sec. can be used. Thus, the detection threshold for head movement between servo sectors is improved, and the speed detection range is increased two or three times compared with the conventional method. As a result, faster track access (seek) performance is possible.

In addition, the increase in the required servo area resulting from the addition of servo patterns M and N to the servo pattern proposed in Japanese Patent Application H2-39979 is negligible and can be ignored when compared with the increased benefit of high speed, short-time track access enabled by improving the maximum head speed. This is because the decrease in the available data area resulting from the addition of servo patterns M and N is at most approximately 0.1–0.2% when converted to data capacity, an amount that can be absorbed within the device design.

TABLE 5

| Period | Signal M | Signal N | Signal D | Signal E | Signal F |
|--------|----------|----------|----------|----------|----------|
| S00 | * | L | * | L | H |
| S01 | H | L | H | L | * |
| S02 | H | L | H | L | * |
| S03 | H | L | H | * | L |
| S04 | H | L | H | H | * |
| S05 | H | L | H | H | * |
| S06 | H | L | * | H | H |
| S07 | H | L | L | H | * |
| S08 | H | L | L | H | * |
| S09 | H | * | L | * | L |
| S10 | H | H | L | L | * |
| S11 | H | H | L | L | * |
| S12 | H | H | * | L | H |
| S13 | H | H | H | L | * |
| S14 | H | H | H | L | * |
| S15 | H | H | H | * | L |
| S16 | H | H | H | H | * |
| S17 | H | H | H | H | * |

TABLE 5-continued

| Period | Signal M | Signal N | Signal D | Signal E | Signal F |
|---|---|---|---|---|---|
| S18 | * | H | * | H | H |
| S19 | L | H | L | H | * |
| S20 | L | H | L | H | * |
| S21 | L | H | L | * | L |
| S22 | L | H | L | L | * |
| S23 | L | H | L | L | * |
| S24 | L | H | * | L | H |
| S25 | L | H | H | L | * |
| S26 | L | H | H | L | * |
| S27 | L | * | H | * | L |
| S28 | L | L | H | H | * |
| S29 | L | L | H | H | * |
| S30 | L | L | * | H | H |
| S31 | L | L | L | H | * |
| S32 | L | L | L | H | * |
| S33 | L | L | L | * | L |
| S34 | L | L | L | L | * |
| S35 | L | L | L | L | * |

Figure 6:
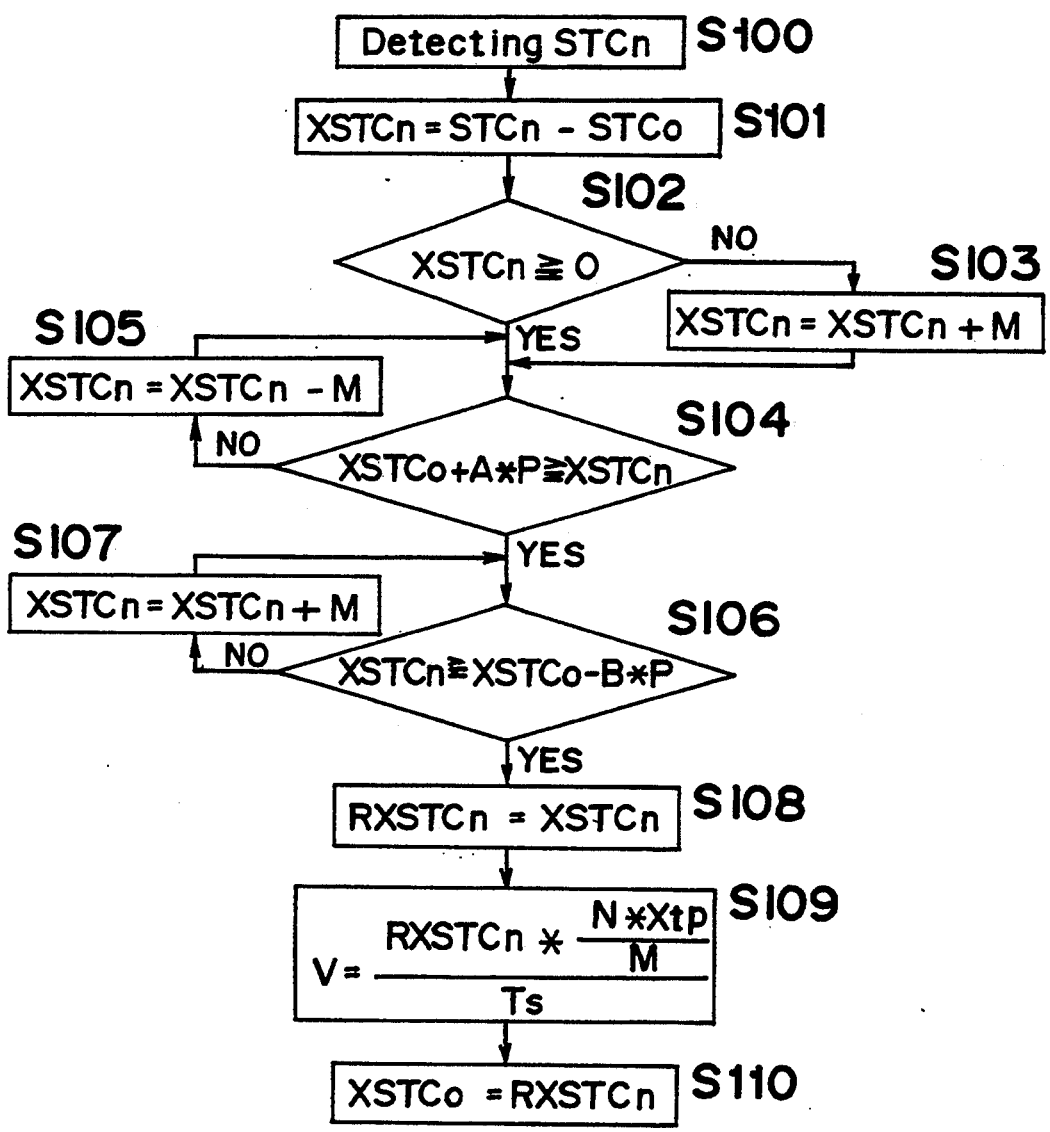
FIG. 6 is a flow chart used to describe the speed calculation method of the present invention.

The speed calculation method of the present invention is described next. FIG. 6 is a flow chart of the calculation wherein V is the speed of head movement, Xtp is the track pitch, Ts is the servo sector sampling cycle, N is the servo pattern cycle, M is a servo pattern of an N-track cycle, $STC_0$ is the subtrack code of the P previous servo sector, $XSTC_0$ is the distance of head travel from the (2 * P) previous servo sector to the P previous servo sector, $STCn$ is the currently sampled subtrack code, $XSTCn$ is the head seek distance calculated from the P previous servo sector to the current servo sector using equation 1, $RXSTCn$ is the real head seek distance from the P previous servo sector to the current servo sector, (A * P) is the first offset value, and (B * P) is the second offset value.

The track code $STCn$ whereby the position of the head in the N-track cycle servo pattern can be recognized is detected each time the head passes the servo sector (Step S100). The head seek distance $XSTCn$ from the P previous servo sector to the current servo sector is then calculated by subtracting the subtrack code $STC_0$ of the P previous servo sector from the subtrack code $STCn$ detected at the current servo sector (Step S101).

The head seek distance $XSTCn$ obtained at Step S101 is then compared with 0 ($XSTCn \geq 0$) at Step S102. This step is required to prevent using a negative head seek distance if the subtrack code detected P previous servo sectors is a high value and the subtrack code detected at the current servo sector is a low value. If ($XSTCn \geq 0$) is false, i.e., $XSTCn < 0$, the procedure branches to Step S103 to make the head seek distance obtained by simple subtraction a positive value by performing the operation $XSTCn = XSTCn + M$.

The head seek distance obtained from either Step S101 or Step S103 is then evaluated (Step S104) to determine whether the calculated value is within the upper threshold of the real head seek distance. The real head seek distance from the P previous servo sector to the current servo sector is within the range of the head seek distance $XSTC_0$ from the (2 * P) previous servo sector to the P previous servo sector plus the change in the head seek distance (A * P), which is obtained from the acceleration of the head movement actuator and the number of cycles between the servo sectors. If the statement ($XSTC0 + (A * P) \geq XSTCn$) is true, the procedure advances to Step S106; if the statement is false, the procedure loops through Step S105 to subtract M from $XSTC_n$ until Step S104 returns true.

The head seek distance obtained from either Step S101 or Step S103 is then evaluated (Step S106) to determine whether the calculated value is within the lower threshold of the real head seek distance. Similarly to Step S104, the real head seek distance from the P previous servo sector to the current servo sector is within the range of the head seek distance $XSTC_0$ from the (2 * P) previous servo sector to the P previous servo sector plus the change in the head seek distance (B * P), which is obtained from the acceleration of the head movement actuator and the number of cycles between the servo sectors. If the statement ($XSTCn \geq XSTC_0 + (B * P)$) is true, the procedure advances to Step S108; if the statement is false, the procedure loops through Step S107 to add M to $XSTCn$ until Step S106 returns true.

The head seek distance $XSTCn$ obtained through Step S106 can therefore be treated as the real head seek distance, and is thus substituted for the previous real head seek distance value $RXSTCn$ at Step S108. The head seek speed is then calculated at Step S109, and the current real head seek distance value $RXSTCn$ is substituted for the head seek distance $XSTC_0$ from the (2 * P) previous servo sector to the P previous servo sector for use in the next head seek speed calculation to be performed at the next servo sector.

The specific application of the above head seek speed calculation according to the present invention is described next.

It is assumed that the 12-track/cycle (N = 12) servo pattern is divided into 48 subtrack codes 0–47 (M = 48), and that the track pitch Xtp = 12 μm, the sample cycle Ts = 300 μsec, and P = 1. The servo pattern cycle is therefore 144 μm, and one subtrack code is 3 μm. If the acceleration of the head movement actuator is a maximum 28 G, the possible change in the head seek distance between servo sectors is approximately 12.3 μm, or approximately four subtrack codes. Thus, the first and second offset values A and B are set at approximately six subtrack codes for tolerance.

It is further assumed that the head is travelling at a relative speed of approximately 45 cm/sec, the previously sampled head position was in subtrack code 2 of the 12-track/cycle servo sector, and the head is currently positioned in subtrack code 3. Applying equation 1 with the values track pitch Xtp = 12 μm and sample cycle Ts = 300 μsec, V = 1 cm/sec. However, the head speed should normally vary smoothly, and it is not possible for the head to suddenly travel at 1 cm/sec. through a short servo sector of only 300 μsec with a maximum acceleration of 28 G. The speed calculation method shown in FIG. 6 is therefore applied.

At Step S101 $XSTCn = 1$ subtrack code, at Step S104 $XSTC_0 + A$ (45 + 6) $\geq XSTCn$ (1), the condition is satisfied and the procedure advances to Step S106. Because the Step S106 condition, $XSTCn(1) \geq XSTC_0 - B$ (45 − 6) is not true, the procedure loops through Step S107 where $XSTCn$ (49) = $XSTCn$ (1) + M (48), and the real head seek speed of 49 cm/sec. is obtained at Step S108.

Furthermore, if the head seek speed is approximately 95 cm/sec., Step S106 will force a loop through Step S107 and the result $XSTCn = 49$ will be obtained. Step S106 will next return false for the evaluation $XSTCn$ (49) $\geq XSTC_0 - B$ (95 − 6), and again force a loop through Step S107. The operation $XSTCn$ (97) = $XSTCn$ (49) + M (48) will then result in $XSTCn = 97$, and the real head seek speed of 97 cm/sec.

can be obtained at Step. S109. Furthermore, the loop of Step S104 and Step S105 also makes it possible to correctly handle a possible negative speed determination.

As thus described, this speed calculation method estimates the range of the real head seek distance that should be obtained for the current servo sector based on the previously calculated head seek distance, and corrects the calculated head seek speed to the true head seek speed even when the servo sector is formed with servo patterns having a short repeat cycle. As a result, because the head seek speed can be calculated without the maximum head seek speed being limited by the repeat cycle of the servo pattern, faster track access and seek performance are possible.

It is to be noted that even if the track codes detected in a time series are from servo sectors on different read/write surfaces of similarly rotating media, this speed calculation method can still be applied.

A head movement speed control device that uses the 24-track cycle, four servo patterns hereinabove is described next.

Figure 7:
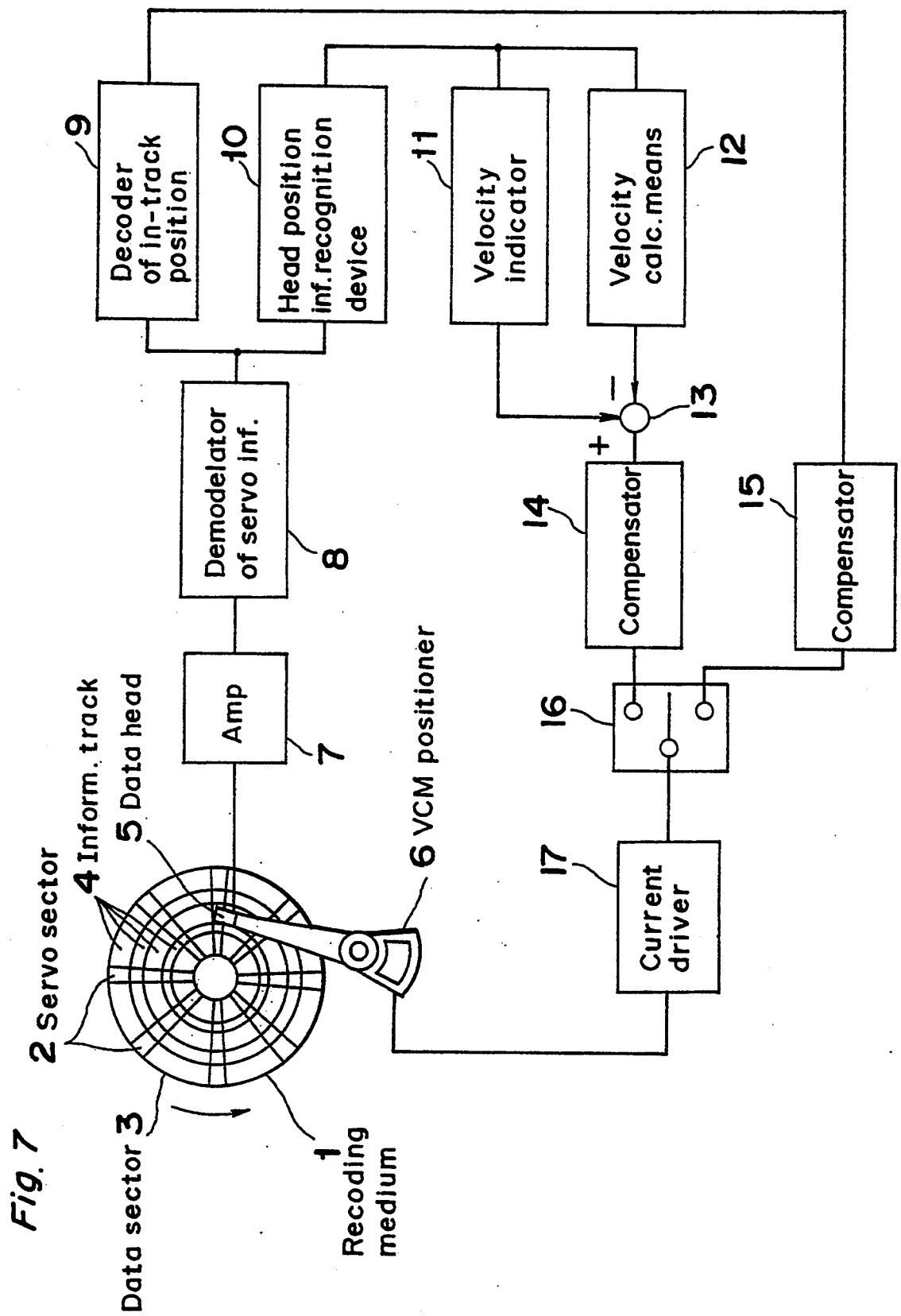
FIG. 7 is a basic block diagram of the head positioning device according to the preferred embodiment of the present invention.

FIG. 7 is a basic block diagram of a head movement speed control device according to the preferred embodiment of the invention. As shown in FIG. 7, the magnetic disk or other recording medium 1 is driven by a spindle motor (not shown in the figures). The servo sectors 2 are dispersed circumferentially around the recording medium 1. The servo sectors 2 are embedded in the surface of the recording medium 1 with 24-track cycle servo information. Data sectors 3 for storing data are also provided on the recording medium 1 together with data tracks 4.

The data head 5 is used to read and write information to the data tracks 4, and is driven by a voice coil motor (VCM) positioner to access the selected data track. An amplifier 7 amplifies the read signal from the data head 5.

The servo data demodulator 8 detects the dispersed servo sectors from the read signal and extracts the servo data. The in-track position decoder 9 detects the dynamic range of the data head 5 position in the data track to within $\pm\frac{1}{2}$ track. The head position information recognition means 10 recognizes the relative position of the data head to the data track to $1/(2^N)$ data track width resolution using the 24-or 36-track/cycle signals M through I. During track access control whereby the data head 5 is driven to access the selected data track, the speed command means 11 outputs a track access speed command according to the distance to the target track or the number of tracks to the target track. The speed command means 11 is normally achieved by means of a ROM table or equivalent means, but the output can also be achieved by applying a mathematical function each time the distance to the target track or the number of tracks to the target track is measured.

The speed calculation means 12 calculates the speed of data head 5 movement in the radial direction of the recording medium based on the speed calculation method of the invention and using the high resolution position information input from the head position information recognition means each time the data head 5 passes the servo sector. The error amplifier 13 calculates the error in the output of the speed command means 11 and the speed calculation means 12.

The output from the error amplifier 13 is input to the compensation means 14 and switch 16, and thus supplied to the current driver 17, which supplies current to the VCM positioner according to the compensation means 14 output, thus completing the track access control loop. The tracking control loop for tracking the selected data track by the data head 5 is completed by inputting the output from the in-track position decoder 9 to the compensation means 15 and switch 16 for supply to the current driver 17.

As wall be known from the block diagram in FIG. 7, the head movement speed control device applying the head position recognition method and speed calculation method of the invention is related to the methods of position recognition and speed control for data head 5 track access (seek). The invention is related particularly to a head movement speed control device that detects the position of the data head 5 to within the width of one track from 24- or 36-track/cycle servo patterns dispersed and embedded around the circumference of the recording medium, and from the relative position of the data head 5 to the track, and essentially comprises a specific servo pattern and speed calculation method. As a result, this head movement speed control device offers the benefits of an increased speed detection range resulting from the four servo patterns with a minimum 24-track cycle formed in the dispersed servo sectors, and an increased head seek speed dynamic range that is not limited by the repeat cycle of the servo patterns. High speed data access and seek performance are thus possible.

Figure 8:
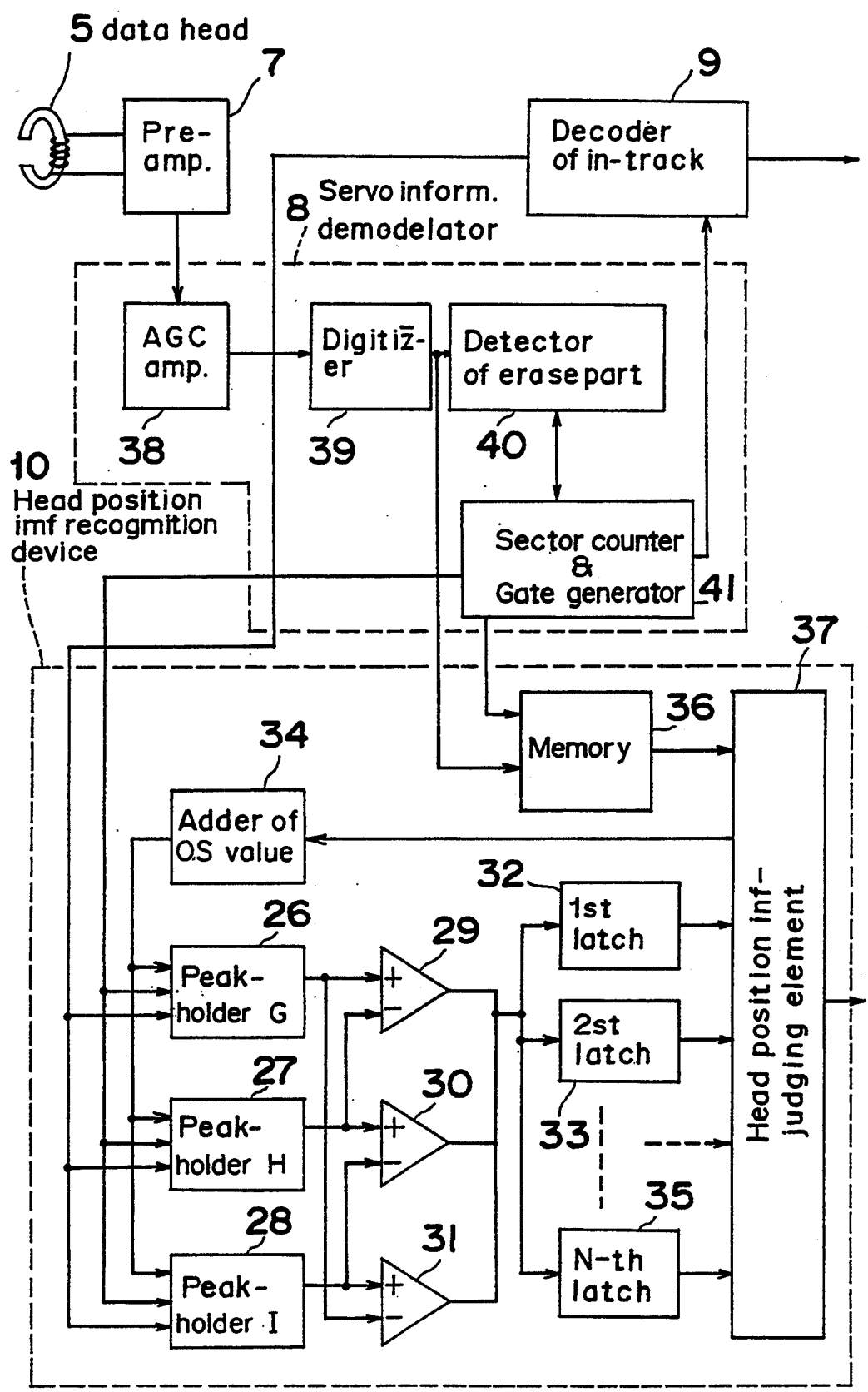
FIG. 8 is a block diagram showing in greater detail the construction of the head position information recognition means and servo data demodulator in a head movement speed control device according to a preferred embodiment of the invention.
Figure 9:
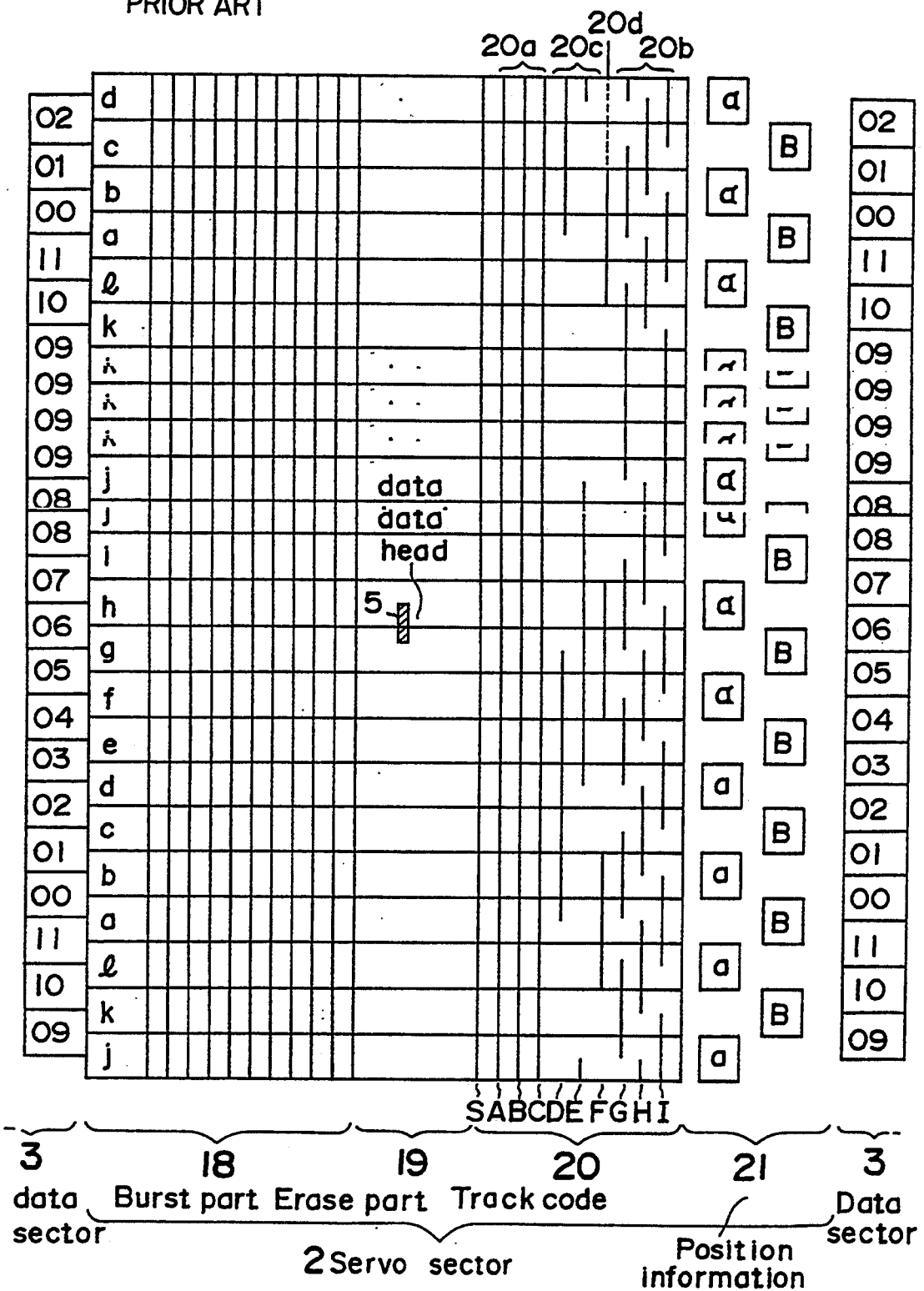
FIG. 9 is an example of the servo pattern in the dispersed servo sectors embedded in the data tracks of a conventional rotary recording medium.
Figure 10:
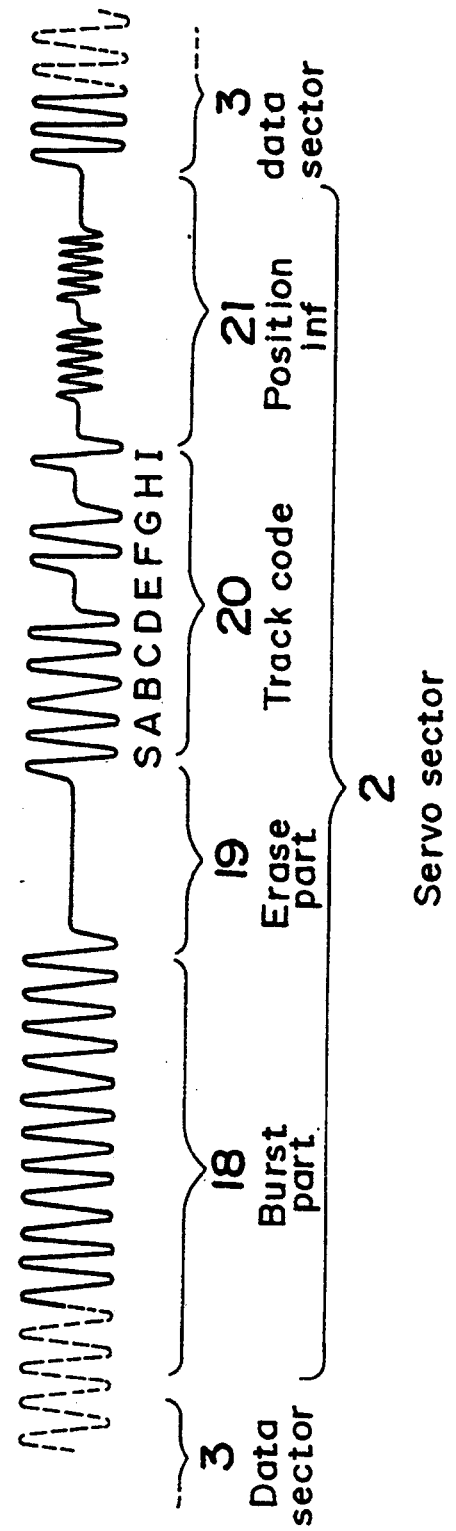
FIG. 10 is an example of the read waveform when the data head crosses the servo sector shown in FIG. 9.

FIG. 8 is a block diagram showing in greater detail the construction of the head position information recognition means 10 and servo data demodulator 8 in a head movement speed control device according to a preferred embodiment of the invention.

The signal detected from the recording medium by the data head 5 is first amplified by the pre-amplifier 7, and the amplified signal is input to the AGC amplifier 38. The AGC amplifier 38 normalizes the amplifier 7 output using the burst area 18 embedded in the servo sector 2.

The servo data demodulator 8 comprises the AGC amplifier 38, a digitizing circuit 39, an erase area detector 40, and a sector counter and gate generator 41.

The digitizing circuit 39 generates a HIGH or LOW signal at a predetermined threshold value from the normalized signal output from the AGC amplifier 38. The erase area detector 40 finds the erase area 19 with the longest period in the continuous binary signal. The sector counter and gate generator 41 starts the counter simultaneously to detection of the erase area 19, generates a gate to detect the $\alpha$ and $\beta$ bursts indicating the track code 20 signals A–I embedded in the servo sector 2 and the in-track position information, and generates a gate for discriminating the data sector 3 and the next servo sector.

To the in-track position decoder 9 are input the gate command from the sector counter and gate generator 41, and the $\alpha$ and $\beta$ bursts indicating the in-track position information from the AGC amplifier. The in-track position decoder 9 performs the operation ($\alpha$ burst - $\beta$ burst), and detects the in-track position of the data head during tracking control.

The head position information recognition means 10 comprises a storage circuit 36, peak value holders G 26, H 27, and I 28, comparators 29, 30, and 31, first 32 through Nth 35 latches, an offset adder 34, offset decoder, and the head position information recognition means 37.

The storage circuit 36 temporarily stores the binary expression for signals A, B, C, D, E, and F from the binary signals input from the digitizing circuit 39. The gate command generated by the sector counter and gate generator 41 is input to the peak value holders G 26, H 27, and I 28, which hold the peak values of signals G, H, and I normalized by the AGC amplifier 38. The first comparator 29 compares the peak values of peak value holders G and H; comparator 30 compares the peak values of peak value holders H and I; and comparator 30 compares the peak values of peak value holders I and G.

The first latch 32 latches the binary results output from the comparators 29, 30, and 31 together with the binary output from the storage circuit 36 to generate the first binary expression. The offset decoder determines to which of the peak value holders G 26, H 27, and I 28 to add the first offset value according to the decoding method shown in Table 3 according to the contents of the first latch 32. The offset adder 34 adds the offset value to the one peak value holder G 26, R 27, or I 28 selected by the offset decoder. The second latch 33 latches the comparison result of the peak value holder corresponding to the peak value holder to which the offset value was added by the offset adder 34.

Based on the result of the second binary expression, the head position information recognition means 37 selects the peak value holder to which the second offset value should be added and inputs the second offset value to the offset adder, compares the peak value corresponding to the peak value holder to which the second offset value was added and forms a third binary expression in the third latch, repeats this process to generate the binary expression through the Nth binary expression for the Nth latch 35, and using the first through Nth binary expressions recognizes the relative position of the data head to the servo track with a precision of $1/(2^N)$ track width.

The head position information recognition means 10 is thus able to detect the relative position of the data head to the servo track with a precision of $1/(2^N)$ track width. During track access control, it is thus possible to recognize the data head seek speed with N-times the resolution possible with the conventional method, and high precision speed control is possible.

It is to be noted that the head position information recognition means 37 may be comprised in firmware using the above Tables 1, 2, 3, and 4 as ROM tables for data head position recognition, and may be comprised in software using a microprocessor.

Furthermore, it should be noted that the head position information recognition means 37 can be comprised in hardware alone using ROM tables, but it can also be comprised from a single chip hardware component and software. As will be known from the above description, the head position recognition method according to the present invention embeds dispersed servo sectors circumferentially to the recording medium, provides four servo patterns with a minimum 24-track cycle in the servo sectors, and is thus able during speed control to correctly calculate the average seek speed of the data head between servo sectors when the movement of the data head between servo sectors is a maximum 24 tracks.

For example, if the track pitch Xtp=12 μm and the sample cycle Ts=300 μsec, the maximum speed Vmax=96 cm/sec. by providing servo patterns with a minimum 24 tracks per cycle. If the servo patterns are provided with a minimum 36 tracks per cycle, the maximum speed Vmax=144 cm/sec. The upper head seek distance threshold between servo sectors is thus improved, and the speed detection range is increased by two or three times that of the conventional method. As a result, high speed track access (seek) performance is possible. Furthermore, as described above, the decrease in the available data area resulting from the addition of servo patterns M and N is at most approximately 0.1–0.2% when converted to data capacity, an amount that can be absorbed within the device design.

Furthermore, the speed calculation method of the invention calculates the head seek speed based on the head seek distance from the P previous servo sector to the current servo sector. A first head seek distance calculated as the sum of the head seek distance obtained at the P-previous servo sector plus a first offset value, and a second head seek distance calculated as the difference of the head seek distance calculated at the P-previous servo sector minus a second offset value are obtained, and if the head seek distance calculated for the current servo sector is not between the first and second head seek distances, M is added to the calculated head seek distance to obtain the real head seek distance.

This speed calculation method estimates the range of the real head seek distance that should be obtained for the current servo sector based on the previously calculated head seek distance, and corrects the head seek speed calculated by applying equation 1 to the true head seek speed even when the servo sector is formed with servo patterns having a short repeat cycle. As a result, because the head seek speed can be calculated without the maximum head seek speed being limited by the repeat cycle of the servo pattern, faster track access and seek performance are possible.

In addition, the head movement speed control device applying the head position recognition method and speed calculation method of the invention offers the benefits of an increased speed detection range resulting from the four servo patterns with a minimum 24-track cycle formed in the dispersed servo sectors, and an increased head seek speed dynamic range that is not limited by the repeat cycle of the servo patterns. High speed data access and seek performance are thus possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed calculation method for calculating a moving speed of a data head comprising:
   defining servo sectors discretely and circumferentially on each surface of a rotary recording medium having at least two recording surfaces,
   providing an N tracks/cycle servo pattern consisting of track codes (where N is an integer) in each of said servo sectors,
   dividing an N-tracks/cycle servo pattern signal by demodulation processing into M subtrack codes (where M is a product of N with a positive integer),
   discriminating the track code, which is detected time sequentially each time the data head passes the servo sector, as subtrack codes by demodulation processing,
   utilizing speed control for accessing the head toward a target track, obtaining a distance of head travel from a distance between a subtrack code demodulated from the track code detected when the head has passed P-previous servo sector (where P is an integer) and a subtrack code demodulated from the track code detected from a current track code, calculating a seek speed of said data head in a radial direction of the recording medium based on said distance of head travel, upon calculating said seek speed of said data head, calculating an upper limit distance of head travel by adding a positive first offset value to a latest distance of head travel which is a difference between a subtrack code demodulated from the track code detected when the data head has passed 2×P-previous servo sector and the subtrack code demodulated from the track code detected when the data head has passed P-previous servo sector and a lower limit of distance of head travel by subtracting a positive second offset value from said latest distance of head travel, and calculating the head seek speed from a distance of head travel obtained by subtracting M from the distance of head travel calculated with respect to the current servo sector when it is larger than said upper limit distance of head travel and, when it is smaller than said lower limit distance of head travel, calculating the head seek speed from a distance of head travel obtained by adding M to the distance of head travel calculated with respect to a current servo sector.

2. The speed calculation method according to claim 1, wherein the first offset value used for generating said upper limit distance of head travel is a distance of head travel obtained when the data head is accelerated by a maximum acceleration generated by a driving actuator for the data head during a time interval determined by P servo sectors, and the second offset value for generating said lower limit distance of head travel is a distance of head travel obtained when the data head is decelerated from a certain head speed by the maximum acceleration during the time interval.

* * * * *